Figure 3:
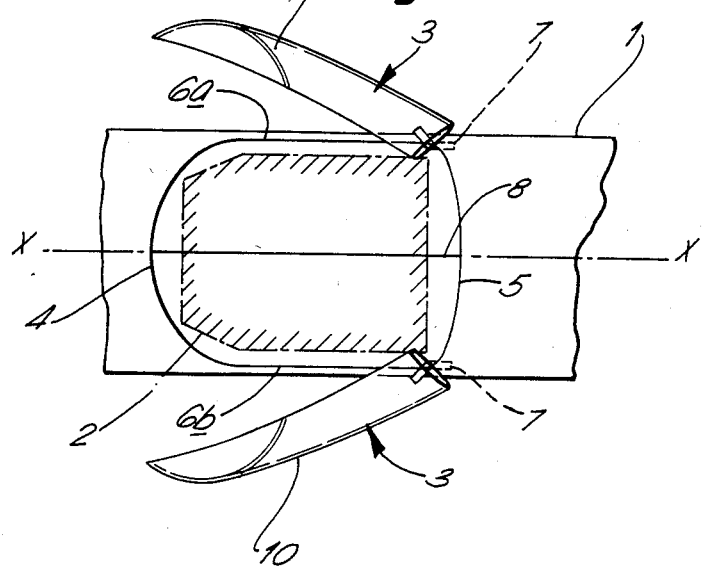

United States Patent [19]

Brophy

[11] Patent Number: 4,580,745
[45] Date of Patent: Apr. 8, 1986

[54] AIRCRAFT COCKPIT CANOPY

[75] Inventor: Gilbert E. Brophy, Brough, United Kingdom

[73] Assignee: British Aerospace Public Limited Company, London, England

[21] Appl. No.: 599,940

[22] Filed: Apr. 13, 1984

[30] Foreign Application Priority Data

Apr. 14, 1983 [GB] United Kingdom ................ 8310056

[51] Int. Cl.$^4$ .............................................. B64C 1/32
[52] U.S. Cl. ............................................ 244/122 AF
[58] Field of Search ....................... 244/121, 122 AF; 89/1 B

[56] References Cited

U.S. PATENT DOCUMENTS 2,971,728  2/1961  Martin .......................... 244/122 AF
3,670,998  6/1972  Charleville et al. ................. 244/121
3,721,407  3/1973  Clarke ................................ 244/121
3,729,154  2/1973  Deplante ..................... 244/122 AF

FOREIGN PATENT DOCUMENTS 2118114A  4/1982  United Kingdom .

Primary Examiner—Galen L. Barefoot
Attorney, Agent, or Firm—Cushman, Darby & Cushman

[57] ABSTRACT

An aircraft cockpit canopy has a separable portion which is capable of being separated from a remaining portion of the canopy at a clearly defined break line by means of detonating cord, to facilitate ejection of a crew member along a predetermined path through the canopy, the separable portion being of such a size that hinges are provided to constrain it to swing in a predetermined path to clear the ejection path, the hinges being attached to the canopy and bridging the break line so that prior to separation, they remain unused but subsequently they are effective to pivotally constrain the separated portion. Conveniently, the separable portion may be in two or three large parts.

9 Claims, 17 Drawing Figures

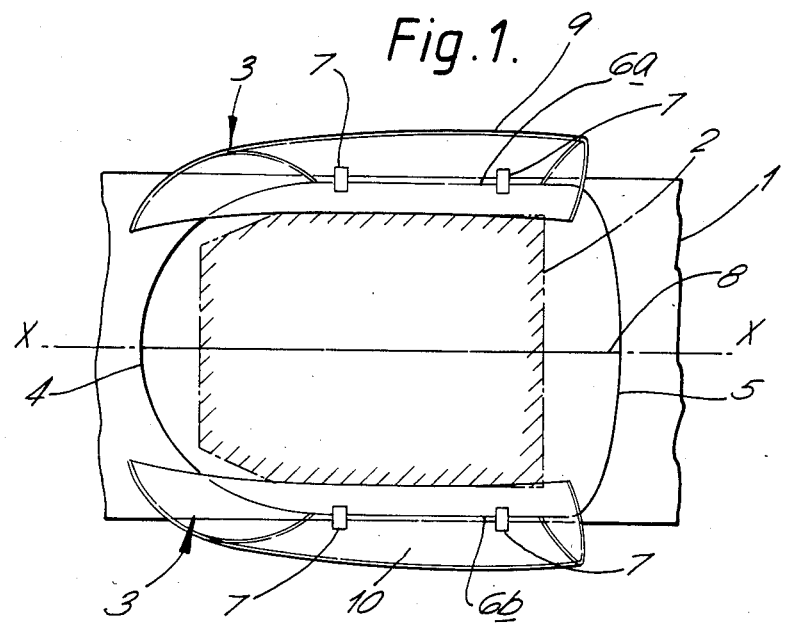
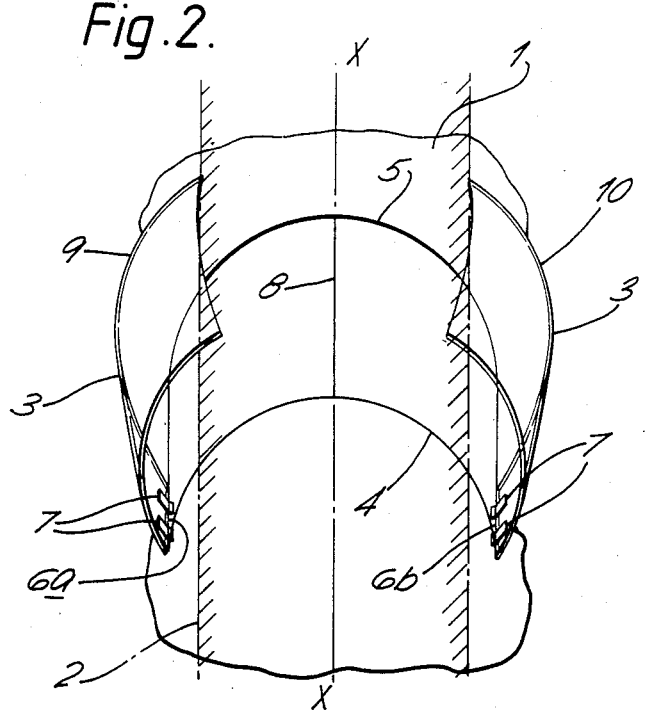

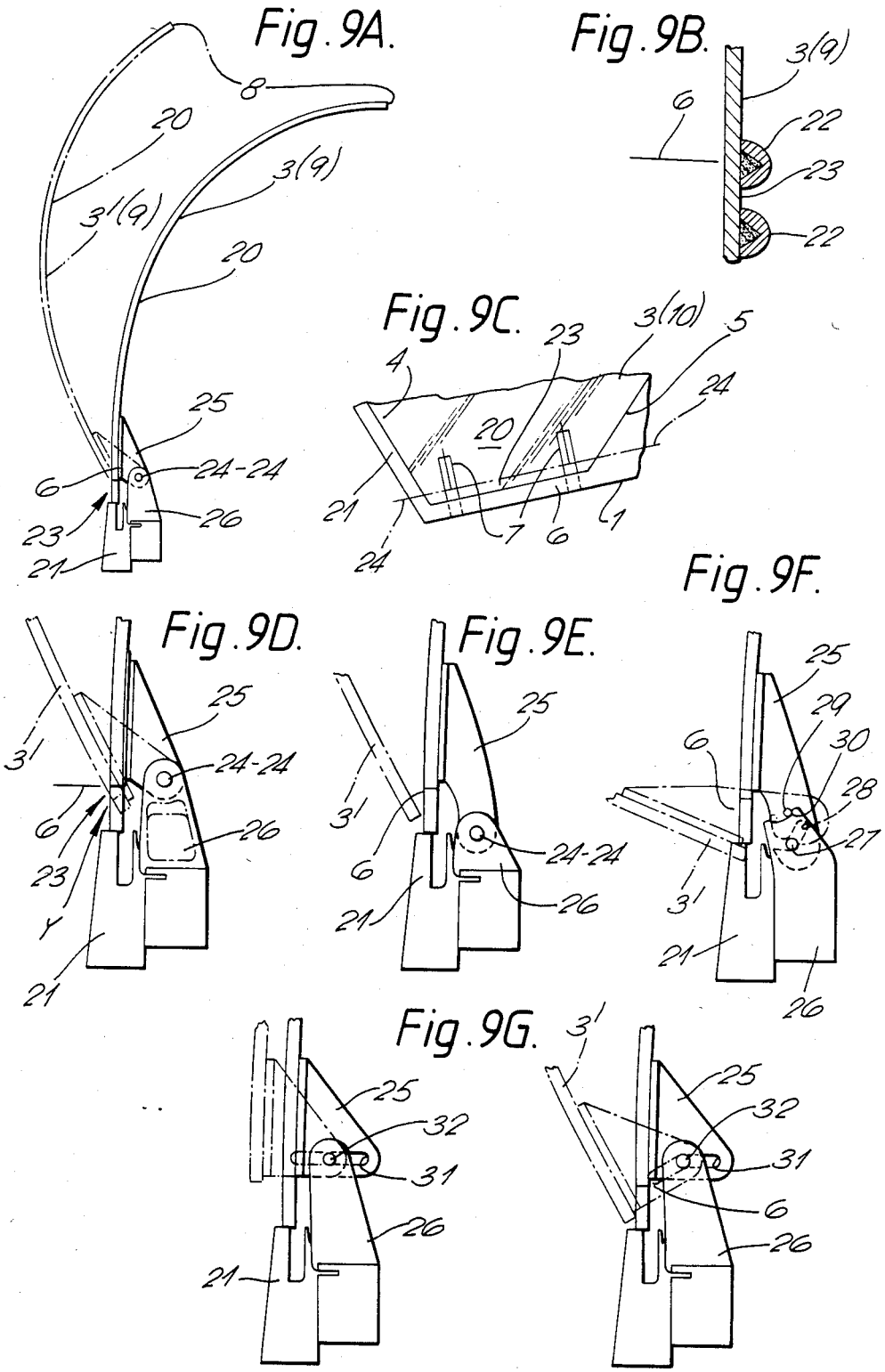

AIRCRAFT COCKPIT CANOPY

This invention relates to aircraft cockpit canopies of the type in which regions thereof are cut or broken into portions to allow a crew member and his ejection seat to eject therethrough in an emergency.

Hitherto, such cockpit canopy regions have been cut and/or broken into relatively small portions which were carried away by the slipstream or were otherwise dispersed from the ejection path. Since the portions were of random size and shape and were dispersed in a somewhat uncontrolled manner, a crew member could well be injured by them.

The present invention has for an objective the provision of a cockpit canopy which, on ejection of a crew member, has its separated portions of a relatively large size, of a chosen configuration, and which can therefore be provided with means to ensure controlled clearance of the ejection path.

According to the present invention, an aircraft cockpit canopy has a separable portion which is capable of being separated from a remaining portion of the canopy at a clearly defined break line to facilitate ejection of a crew member along a predetermined ejection path through the canopy, detonation cord means affixed to the canopy which on detonation is effective to sever the canopy along said break line, and hing means comprising two hinge anchorage portions and pivot means pivoting said anchorage portions one to the other, one hinge anchorage portion being anchored to the separable portion and the other to said remaining portion such that said hinge means bridges the break line, said hinge means remaining unused prior to separation of the separable portion but, on such separation, said hinge means is effective to cause the separable portion to swing away from the ejection path.

Figure 4:
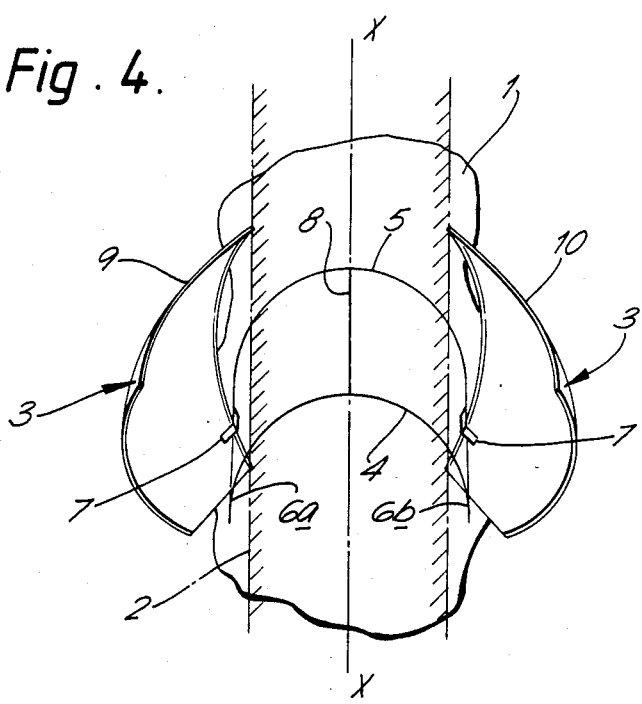
Figure 5:
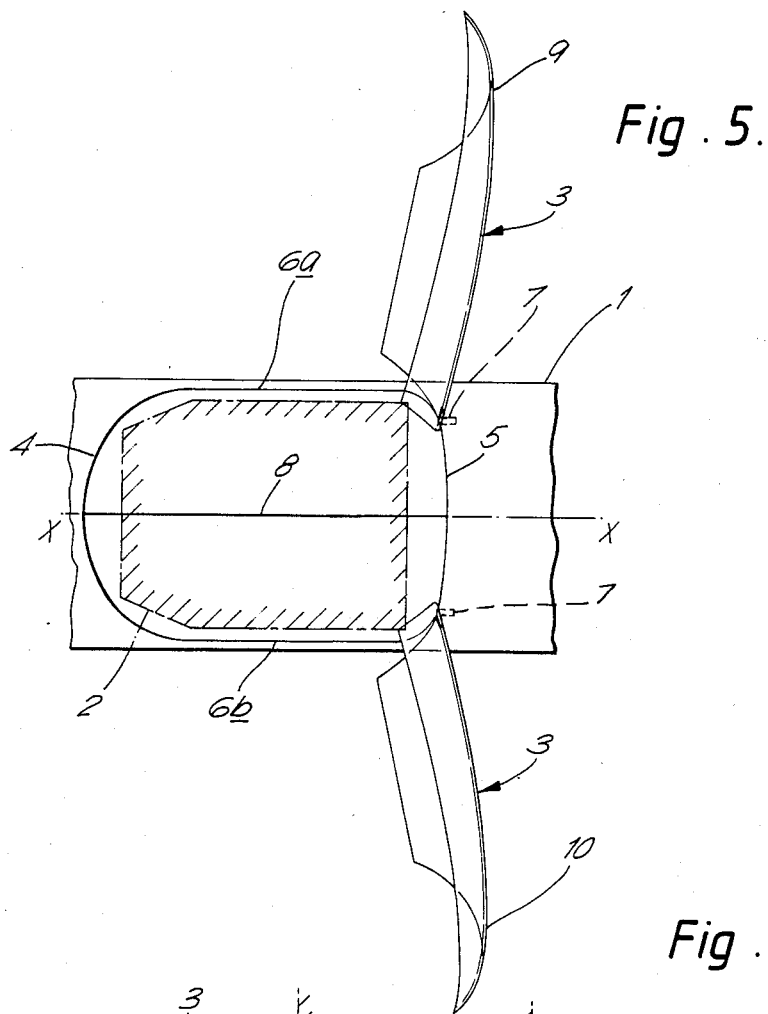
Figure 6:
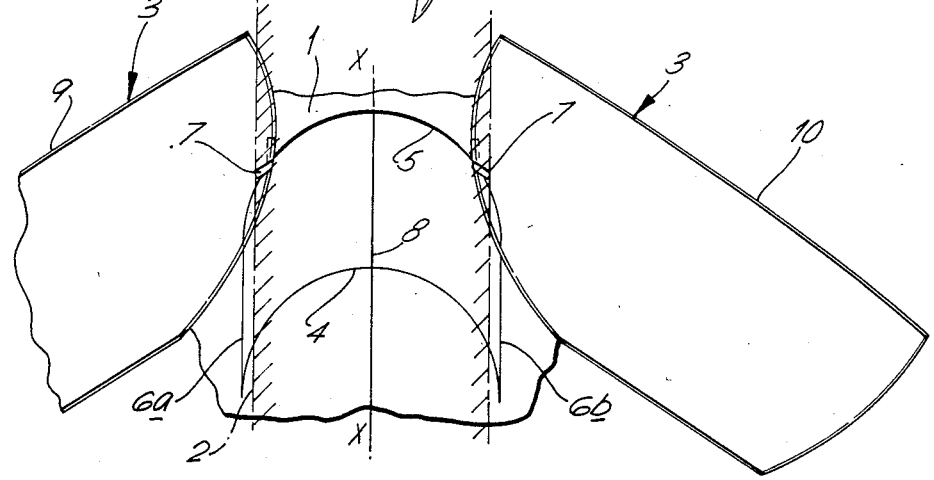
Figure 7:
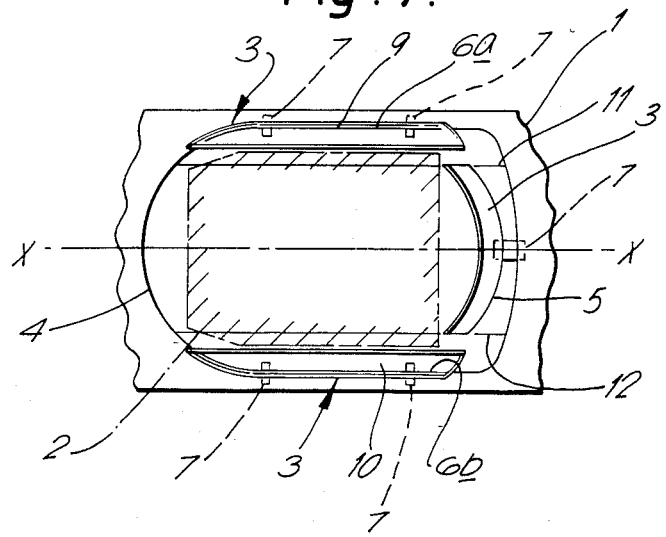
Figure 8:
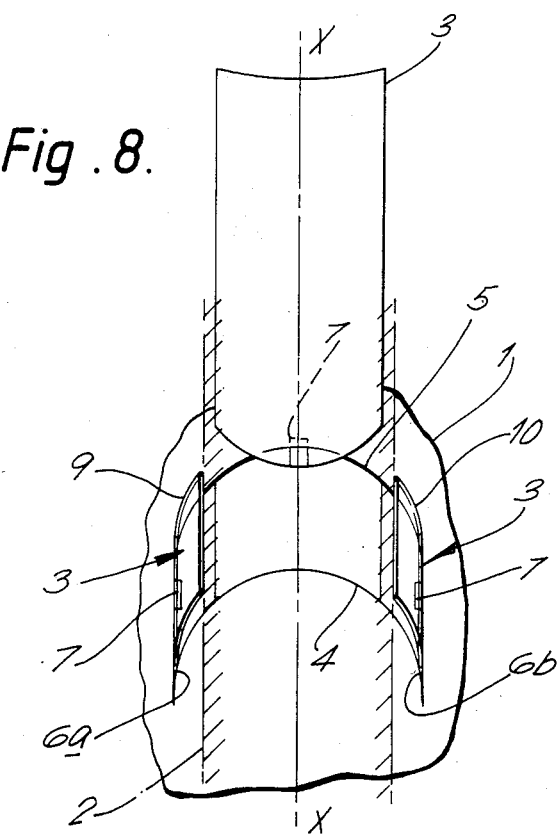
Figure 9H:
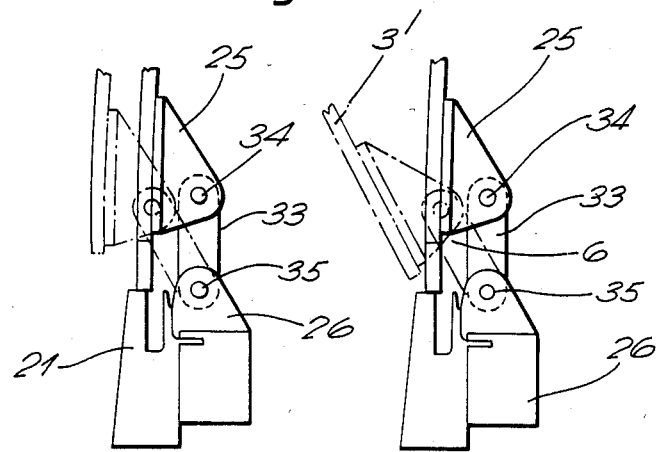

Some embodiments of the invention are described by way of example with reference to the accompanying drawings in which:

FIG. 1 is a view of a cockpit canopy along an ejection path, that is to say in effect a plan view, with one form of separable portion, FIG. 2 is a view of the cockpit canopy of FIG. 1 from the front, FIGS. 3 and 4 are respectively similar views of an alternative canopy, FIGS. 5 and 6 are respectively views of the canopy of FIGS. 3 and 4, FIGS. 7 and 8 are respectively similar views of an alternative cockpit canopy embodiment, FIGS. 9A and B illustrate part cross-sections through the cockpit canopy of FIGS. 1 and 2, FIG. 9C illustrates a side view of the canopy of FIGS. 1 and 2 on a reduced scale, and FIGS. 9D-I illustrate various types of hinge means.

Referring to FIGS. 1 to 9C, a cockpit canopy 1 is required to clear an ejection path 2 (shown as a shaded box area in FIGS. 1, 3, 5 and 7 and as spaced parallel lines, also with shading, in FIGS. 2, 4, 6 and 8) so that a crew member, his ejector seat, and any assoiciated survival gear can pass through the canopy substantially unimpeded. In other words, the ejection path 2 is a region swept by the passage of the crew member and his ejector seat.

The canopy 1 is formed with a separable portion 3 which, before separation, is an integral part of the canopy. As will be later described, the separable portion may be in several parts. Separation is by cutting with a known form of miniature detonating cord 22 (FIG. 9B) fixed to the canopy along clearly defined break lines. The break lines have a forward region 4 disposed toward the front of the canopy ahead of the ejection path 2, that is to say to the left of FIGS. 1, 3, 5, 7 and 9C, and, extending generally transversely across the canopy, a rearward region 5 disposed behind the ejection path and also extending generally transversely, and two side regions 6a and b spaced one from the other and extending generally longitudinally of the canopy one to each side of the ejection path. These side regions 6a and 6b join respective lateral extremities of the forward and rearward regions so that, on detonation of the cord 22, a separable portion 3 of the canopy of sufficient size to give successful egress of a crew member is separated from the remainder of the canopy.

To ensure that on separation, the separable portion 3 (that is to say, its various parts) is constrained to swing away from the ejection path 2 in a predetermined manner, hinges 7 are provided. These straddle or bridge the break line to connect edges of the separable portion to adjacent edges of the remaining portion of the canopy, the hinges remaining unused until separation is effected even though they are attached to the canopy.

Typical hinges are described with reference to FIGS. 9A to I.

Reverting now to FIGS. 1 and 2, the separable portion 3 is in two parts 9, 10 formed by providing a further break line region 8 extending longitudinally to connect intermediate parts of the forward and rearward break line regions 4 and 5. Conveniently, the region 8 lies on the fore-and-aft centre line of the canopy.

Two pairs of hinges 7 are provided, one pair straddling the break line region 6a and one pair straddling the break line region 6b. Thus on separation, the two parts 9, 10 are constrained to swing open away from one another after the manner of a clam shell about axes 24—24 slightly offset, but generally approximating, to the side regions 6a and 6b.

In FIGS. 3 and 4, the same break line regions are provided to give the two separable parts 9 and 10, but the hinges 7 are positioned at the junctions between break line regions 5, 6a and 5, 6b. Thus the parts 9 and 10 are constrained to open away from each other in an outwardly and rearwardly direction after the manner of petals. They thus obtain aid in opening movement from the aircraft slip-stream. FIGS. 3 and 4 show opening to just clear the ejection path; FIGS. 5 and 6 show a canopy with a similar separable portion with parts 9 and 10 but with the hinges 7 repositioned to allow a much more spread-open position.

In FIGS. 7 and 8 similar break line regions 4, 5, 6a and 6b are provided but that referenced 8 is replaced by two spaced longitudinal regions 11, 12 also extending between intermediate parts of the forward and rearward regions 4 and 5. The regions 11, 12 lie symmetrically one to either side of the longitudinal axis X—X. The separable portion 3 is thus, in this embodiment, formed in three parts, two lateral parts 9, 10 similar to those of FIGS. 1-6 but narrower, and a third central part 13. The two lateral parts 9, 10 can be hinged, as drawn, similarly to the embodiment of FIGS. 1 and 2 but could also be hinged as the embodiments of FIGS. 3-6. The part 13 is hinged at a rearward edge, so that it can swing upwards and rearwards and thus benefit from slip stream effects to effect rapid opening.

In each case, the parts of the separable portion 3 may be totally released after swinging to the desired position. Tether means, not shown, may be used to aid the constraining effect of the mechanical hinges shown.

In FIGS. 9A, B and C, the cockpit canopy 1 includes a transparency 20 with a reinforcing surround 21. The transparency is shown in its unbroken, operational state. Break lines are shown at regions 4, 5, 6 and 8. Each is provided with lengths of detonating cord 22, a local cross-section of a break line region and its associated cord is shown in FIG. 9B. On those break line regions having hinges 7, to provide adequate clearance for the edges of the separable region as it swings subsequent to separation, two parallel break lines may be provided by placing detonating cords 22 side-by-side such that a strip of the canopy is removed to prevent fouling. Such edges are shown at 23.

On detonation of the cords 22, a part 9 of the separated portion 3 swings to the position 3' as constrained by hinges 7. It swings about a hinge axis 24—24 which is offset to the side of the canopy break line inside the canopy. In FIG. 9A, a hinge 7 is formed in two parts 25, 26 pivoted to one another at the hinge line 24—24. That part 25 is fixed to a part of the separable portion 3 whilst the other part is fixed to a remaining portion of the canopy either transparent or, as shown, the metallic structural frame 21.

FIG. 9D, which is an enlarged vie w of the hinge region D of FIG. 9A, illustrates the fouling at Y of those regions of the separable and remaining portions of the canopy which lie adjacent the break line (e.g. 6) as swinging about the hinge line 24—24 occurs. As previously discussed, this fouling can be mitigated or prevented, by removing a strip 23 of the canopy in this region. Additionally or alternatively, hinge embodiments of the type illustrated in FIGS. 9E to 9I can be utilised for the same purpose. These Figures are all similar views to that of FIG. 9D and are on a similar scale. Like components are allotted like reference numerals.

Figure 9I:
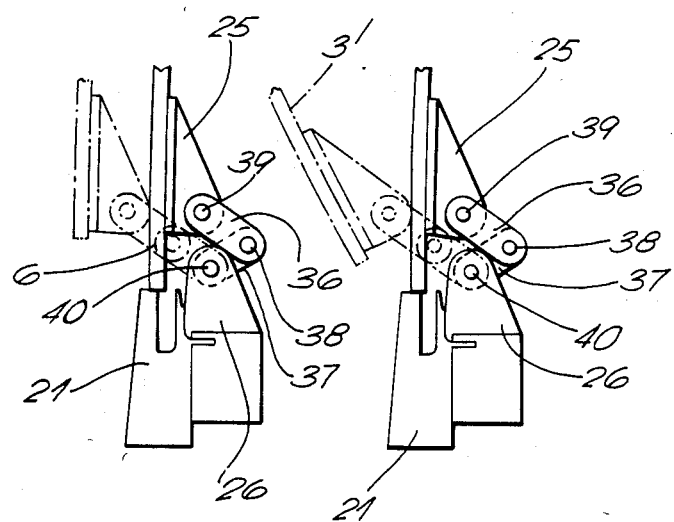

FIGS. 9D, 9E and 9F show hinge arrangements having a rotational movement only, whilst FIGS. 9G, 9H and 9I show arrangements with a bodily outboard movement followed by a rotational movement. These latter Figures each include two drawings to show the two distinct movements.

In FIG. 9E, the hinge line 24—24 is moved to a position lower than, instead of adjacent the break line (e.g. 6), as in FIG. 9D. The arm 25 is accordingly extended.

In FIG. 9F, a releasable hinge is provided. In this arrangement, a hinge pivot 27 is carried by that part 26 of hinge whilst the other part 25 is provided with a slot 28 within which the pivot 27 lies. A pin 29 carried by the part 25 engages a shoulder 30 on the part 26 when the canopy is in its unbroken position, thus ensuring that the pivot 27 remains in the base of the slot 28. On separation, the separated portion of the canopy swings outboard about the pivot 27, the pin 29 disengages the shoulder 30 so that subsequent rotation of the hinge part 25 with respect to the part 26 allows the pivot 27 to disengage the slot 28.

In FIG. 9G, the hinge part 25 has a laterally extending slot 31 engaged by a pivot pin 32 which, on detonation of the cord 22, allows the separated portion 3 of the canopy to move outboard until the pin 32, which originally engaged an outboard end of the slot 31, engages an inboard end of the slot 31, whereupon swinging can take place to the 3' position.

FIG. 9H shows the two hinge parts 25 and 26 interconnected by a link 33 pivoted at 34 and 35 respectively on the hinge parts.

Detonation of the cord 22 allows the separated portion of the canopy to move outboard as the link 33 swings arcuately about its pivot 35. Subsequently the separated portion of the canopy swings about the pivot 34 to move to the 3' position.

Finally, FIG. 9I shows the two hinge parts 25 and 26 interconnected by twin links 36 and 37 pivoted to one another at 38 and to hinge parts 25 and 26 respectively at 39 and 40. In the canopy unbroken state, the two links 36 and 37 are folded such that on detonation of the cord 22, the separated portion 3 of the canopy moves bodily outboard as the link 37 rotates about the pivot 40 until it is aligned with the link 36. Subsequently, the separated portion 3 swings about the pivot 39 to the 3' position.

In all cases, a stop device, for example taking the form of a ratchet, can be incorporated to ensure that no parts of the separated portions move back into the ejection path.

I claim:

1. An aircraft cockpit canopy having a separable portion which is capable of being separated from a remaining portion of the canopy at a clearly defined break line to facilitate ejection of a crew member along a predetermined ejection path through the canopy, detonation cord means affixed to the canopy which on detonation is effective to sever the canopy along said break line, and hinge means comprising two hinge anchorage portions and pivot means pivoting said anchorage portions one to the other, one hinge anchorage portion being anchored to the separable portion and the other to said remaining portion such that said hinge means bridges the break line, said hinge means remaining unused prior to separation of the separable portion but, on such separation, said hinge means is effective to cause the separable portion to swing away from the ejection path.

2. An aircraft according to claim 1, wherein the break line has a forward region disposed towards the front of the canopy and extending generally transversely of the canopy, a rearward region spaced aft of the forward region and also extending generally transversely of the canopy, two side regions spaced one from the other and extending generally longitudinally of the canopy to join respective lateral extremities of the forward and rearward regions, and at least one intermediate region extending generally longitudinally of the canopy to join the forward and rearward regions intermediate their extremities so that the separable portion is formed in at least two parts.

3. An aircraft cockpit canopy according to claim 2, in which each side region of the break line has hinge means arranged to constrain its respective part of the separable portion of the canopy to swing away from the other part or parts.

4. An aircraft cockpit canopy according to claim 2, in which each lateral extremity of the rearward region of the break line has hinge means arranged to constrain its respective part of the separable portion to swing away from the other part.

5. An aircraft cockpit canopy according to claim 3, wherein a single intermediate region of the break line is provided so that the separable portion is formed in two parts.

6. An aircraft cockpit canopy according to claim 3, wherein two intermediate regions of the break line are provided so that the separable portion is formed in three parts, that part having the two intermediate regions of the break line having hinge means at the rearward region of the break line.

7. An aircraft cockpit canopy according to claim 1, wherein said hinge means include means to allow bodily outboard displacement of the or each part of the separable portion of the canopy with respect to the remaining portion of the canopy whereby fouling of adjacent edges of the separated and remaining portions of the canopy is at least reduced.

8. An aircraft cockpit canopy according to claim 1, wherein two generally parallel break lines are provided at those break line regions having said hinge means such that a part of the canopy is removed when said separable portion is separated whereby fouling of adjacent edges of the separated and remaining portions of the canopy is at least reduced.

9. An aircraft cockpit canopy according to claim 1, wherein said hinge means include means when a position away from the ejection path is reached to tend to hold the or each part of the separable portion in that position.

* * * * *